July 14, 1942. B. G. BROWN 2,290,092
AIR CLEANER AND SILENCER ASSEMBLY
Filed June 28, 1940
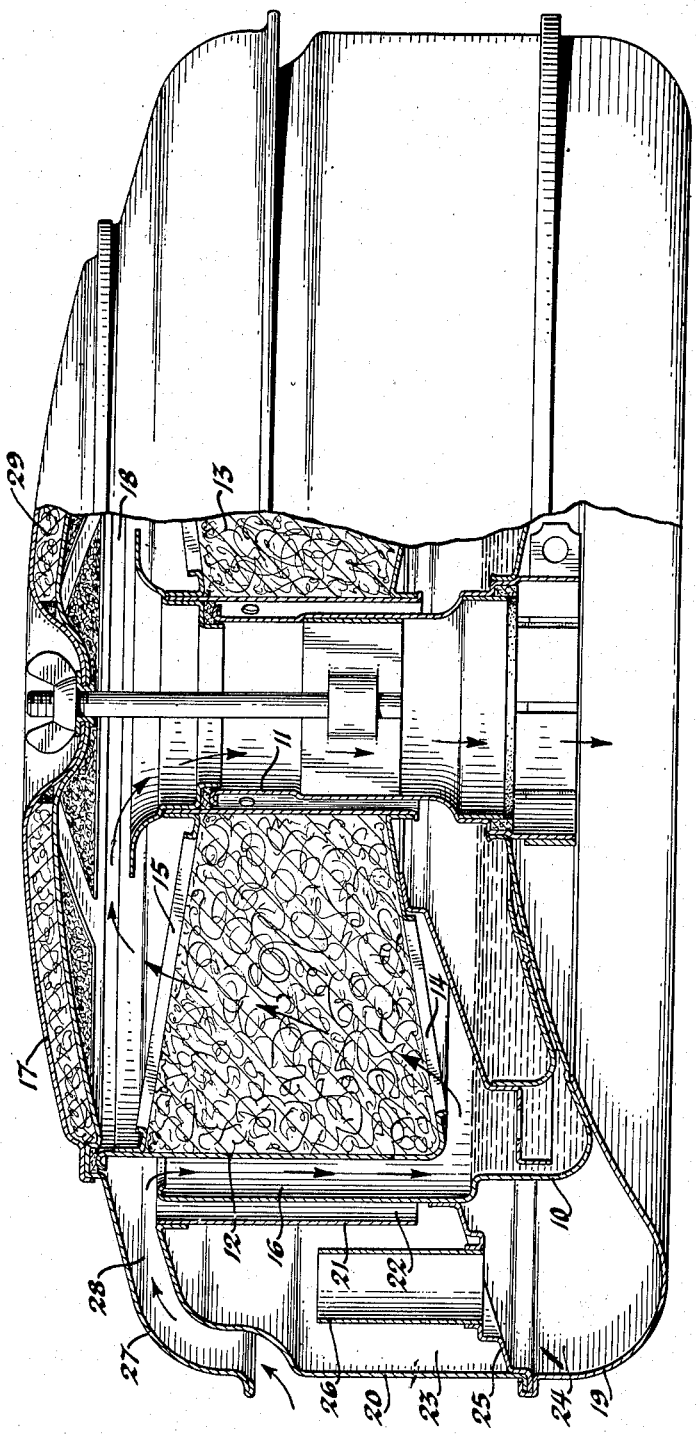
Inventor
Benjamin Gratz Brown
By
Blackmore, Lomas & Flint
Attorneys Patented July 14, 1942

2,290,092

UNITED STATES PATENT OFFICE 2,290,092

AIR CLEANER AND SILENCER ASSEMBLY

Benjamin Gratz Brown, Flint, Mich., assignor to General Motors Corporation, Detroit, Mich., a corporation of Delaware Application June 28, 1940, Serial No. 342,869

9 Claims. (Cl. 183—15)

This invention has to do with air cleaner and silencer assemblies in which one of the members encircles the other and has for its principal object to provide an assembly of this type in which may be incorporated without substantial alteration an air cleaner of conventional design and economies in manufacture thus effected.

For a better understanding of the nature and objects of this invention, reference is made to the following specification wherein is described the preferred embodiment of the invention which is illustrated in the accompanying drawing:

The single figure of the accompanying drawing is a view, partly in vertical section and partly in side elevation, of a liquid-bath type air cleaner and resonator silencer assembly in accordance with my invention.

The basis of the assembly shown in the drawing is a liquid-bath type air cleaner of what has been called the "hat" type. It includes a bowl-like member 10 with an orifice in the center of its bottom in which there is secured a tube 11 which extends well up into the bowl-like member. The tube 11 defines with the bowl-like member an annular reservoir which is filled with oil or some other suitable liquid to about the level indicated in the drawing before the assembly is put into use. The tube 11 is encircled by an annular filter which consists of a shell 12 filled with a suitable air filtering medium 13 which is wetted with the liquid which the annular reservoir contains. The inner and outer walls of the filter element are basically imperforate but there are in its lower and upper walls air inlet and outlet orifices 14 and 15. The filter is supported from the upper end of the tube 11 with its lower wall above the level of the liquid in the annular reservoir and its outer side wall spaced radially from the side wall of the bowl-like member so as to leave therebetween an annular passage 16 from which air may pass into the inlet orifice 14 in the filter. On the outer edge of the filter there is seated a cover 17, lined with a pad 29 of sound absorbing material, which closes the upper ends of the filter and the tube 11 to the atmosphere but is spaced from the latter and from the former except at its outer edge to define a passage 18 through which air may pass from the outlet orifice 15 in the filter into the upper end of the tube.

The resonator silencer is incorporated in the assembly by welding or otherwise suitably securing to the bottom of the bowl-like member 10 near its outer edge the generally horizontal wall of a generally angle shaped annular member 19 with its generally vertical wall extending upwardly. To the upper end of the generally vertical wall of the member 19 there is secured the lower end of the generally vertical wall of another generally angle shaped annular member 20 with its generally horizontal wall extending toward the side wall of the bowl-like member 10. To the inner edge of the generally horizontal wall of the member 20 there is secured the upper end of a cylindrical member 21 which encircles and is spaced radially from the side wall of the bowl-like member to define with it an annular aperture 22 whose lower end opens into the sound wave attenuating compartment defined by the side wall of the bowl-like member and the members 19 and 20. This compartment is divided into primary and secondary resonance chambers 23 and 24 by a partition 25 which is secured in the joint between the members 19 and 20 and to the side wall of the bowl-like member 10 and through which extends a tube 26 which connects the chamber 24 to the chamber 23.

The cover 17 has on it an extension 27 which projects beyond the outer edge of the filter and projects beyond the outer edge of the filter and generally parallel to but spaced from the upper portion of the member 20 and defines with the latter a passage 28 through which air may pass from the atmosphere into the upper end of the passage 16 and into which the upper end of the aperture 22 opens.

The assembly shown in the drawing was designed for installation on an internal combustion engine with the lower end of the tube 11 connected to the air intake tube of its carburetor. When the assembly is so installed and the engine is operating, the suction created by the pistons of the engine on their suction strokes draws air into the passage 28 and through it, the passage 16, the filter 12—13, the passage 18 and the tube 11 and into the carburetor and cylinders of the engine. In the course of its passage through the assembly the air will, of course, be freed of foreign matter by the air cleaner. The resonator which consists of the resonance chambers 23 and 24, the tube 26 and the aperture 22, which will, of course, be so tuned that it responds to and attenuates by resonance preselected objectionable sound waves in the intake noises of the engine on which the assembly is installed, will, in conjunction with the pad 29 of sound absorbing material, eliminate the intake noises of the engine. The assembly shown in the drawing consequently represents a compact, particularly in the matter of height, and efficacious means of silencing the intake noises of an internal combustion engine and removing foreign matter from the combustion supporting air required by it.

I claim:

1. In an air cleaner and silencer assembly, a bowl-like member, a tubular member which opens through the bottom of the bowl-like member and with it defines an annular liquid reservoir, a filter member with orifices in its lower and upper walls disposed within the bowl-like member around the tubular member with its outer side and lower walls spaced from the side wall and bottom of the bowl-like member to define a passage through which air may travel into the orifice in the lower wall of the filter member, a member which encircles the bowl-like member and with the side wall of the bowl-like member defines a sound wave attenuating compartment, the member including a generally horizontal lower wall which extends toward and is secured to the bowl-like member and a generally horizontal upper wall which extends toward the bowl-like member and from which depends an annular wall which encircles and is spaced radially from the side wall of the bowl-like member and with it defines an annular aperture which opens at its lower end into the sound wave attenuating compartment, and a cover which is seated on the outer edge of the filter member and constitutes a wall of a passage through which air may travel from the orifice in the upper wall of the filter member into the upper end of the tubular member and extends outwardly beyond the upper end of the annular aperture which opens at its lower end into the sound wave attenuating compartment and is spaced from the generally horizontal upper wall of the member which encircles the bowl-like member to define with it a passage into which the upper end of the annular aperture opens and through which air may travel from the atmosphere into the upper end of the passage between the side wall of the bowl-like member and the outer side wall of the filter member.

2. In an air cleaner and silencer assembly, a bowl-like member, a tubular member which opens through the bottom of the bowl-like member and with it defines an annular liquid reservoir, a filter member with orifices in its lower and upper walls disposed within the bowl-like member around the tubular member with its outer side and lower walls spaced from the side wall and bottom of the bowl-like member to define a passage through which air may travel into the orifice in the lower wall of the filter member, a member which encircles the bowl-like member and with the side wall of the bowl-like member defines a sound wave attenuating compartment with an upwardly opening orifice in it, and a cover which is seated on the outer edge of the filter member and constitutes a wall of a passage through which air may travel from the orifice in the upper wall of the filter member into the upper end of the tubular member and extends outwardly beyond the upwardly opening orifice in the sound wave attenuating compartment and is spaced from the upper wall of the member which encircles the bowl-like member to define with it a passage into which the orifice opens and through which air may travel from the atmosphere into the upper end of the passage between the side wall of the bowl-like member and the outer side wall of the filter member.

3. In an air cleaner and silencer assembly, a bowl-like member, a tubular member which opens through the bottom of the bowl-like member and with it defines an annular liquid reservoir, a filter member with air inlet and outlet orifices in it disposed within the bowl-like member around the tubular member with its outer side and lower walls spaced from the side wall and bottom of the bowl-like member to define a passage through which air may travel into the air inlet orifice in the filter member, a sound wave attenuating compartment which encircles the bowl-like member and has in it an orifice which communicates with the passage through which air may travel into the air inlet orifice in the filter member, and a cover which is seated on the outer edge of the filter member and constitutes a wall of a passage through which air may travel from the air outlet orifice in the filter member into the upper end of the tubular member.

4. In an air cleaner and silencer assembly, a bowl-like member which constitutes a liquid reservoir, a filter member with orifices in its lower and upper walls disposed within the bowl-like member with its outer side and lower walls spaced from the side wall and bottom of the bowl-like member to define a passage through which air may travel into the orifice in the lower wall of the filter member, a member which encircles the bowl-like member and with the side wall of the bowl-like member defines a sound wave attenuating compartment, the member including a generally horizontal lower wall which extends toward and is secured to the bowl-like member and a generally horizontal upper wall which extends toward the bowl-like member and from which depends an annular wall which encircles and is radially spaced from the side wall of the bowl-like member and with it defines an annular aperture which opens at its lower end into the sound wave attenuating compartment, a tubular member through which air may be withdrawn from the assembly, and a cover which is seated on the outer edge of the filter member and constitutes a wall of a passage through which air may travel from the orifice in the upper wall of the filter member into the inner end of the tubular member and extends outwardly beyond the upper end of the annular aperture which opens at its lower end into the sound wave attenuating compartment and is spaced from the generally horizontal upper wall of the member which encircles the bowl-like member to define with it a passage into which the upper end of the annular aperture opens and through which air may travel from the atmosphere into the upper end of the passage between the side wall of the bowl-like member and the outer side wall of the filter member.

5. In an air cleaner and silencer assembly, a bowl-like member which constitutes a liquid reservoir, a filter member with orifices in its lower and upper walls disposed within the bowl-like member with its outer side and lower walls spaced from the side wall and bottom of the bowl-like member to define a passage through which air may travel into the orifice in the lower wall of the filter member, a member which encircles the bowl-like member and with the wall of the bowl-like member defines a sound wave attenuating compartment with an upwardly opening orifice in it, a tubular member through which air may be withdrawn from the assembly, and a cover which is seated on the outer edge of the filter member and constitutes a wall of a passage through which air may travel from the orifice in the upper wall of the filter member into the inner end of the tubular member and extends outwardly beyond the upwardly opening orifice in the sound wave attenuating compartment and is spaced from the upper wall of the member which encircles the bowl-like member to define with it a passage into which the orifice opens and through which air may travel from the atmosphere into the upper end of the passage between the side wall of the bowl-like member and the outer side wall of the filter member.

6. In an air cleaner and silencer assembly, a bowl-like member which constitutes a liquid reservoir, a filter member with air inlet and outlet orifices in it disposed within the bowl-like member with its outer side and lower walls spaced from the side wall and bottom of the bowl-like member to define a passage through which air may travel into the air inlet orifice in the filter member, a sound wave attenuating compartment which encircles the bowl-like member and the mentioned passage and has in it an orifice which communicates with the passage through which air travels into the air inlet orifice in the filter member, a tubular member through which air may be withdrawn from the assembly, and a cover which is seated on the outer edge of the filter member and constitutes a wall of a passage through which air may travel from the air outlet orifice in the filter member into the inner end of the tubular member.

7. In an air cleaner and silencer assembly, a member of bowl-like form, a filter member with air inlet and outlet orifices in it disposed within the member of bowl-like form with its outer side and nearest end walls spaced from the side and end walls of the member of bowl-like form to define a passage through which air may travel into the air inlet orifice in the filter member, a sound wave attenuating compartment which encircles the member of bowl-like form and the mentioned passage and has in it an orifice which communicates with the passage through which air travels into the air inlet orifice in the filter member, a tubular member through which air may be withdrawn from the assembly, and a closure which is seated on the outer edge of the filter member and constitutes a wall of a passage through which air may travel from the air outlet orifice in the filter member into the inner end of the tubular member.

8. In an air cleaner and silencer assembly, an air cleaner with an imperforate outer side wall, a sound wave attenuating compartment which encircles the air cleaner and is spaced from the outer side wall thereof to define a passage through which air may enter the air cleaner, a member which bridges and closes to the atmosphere at one end the space between the air cleaner and the silencer and constitutes a wall of the passage through which air enters the air cleaner, and means through which air may be withdrawn from the air cleaner communicating with it at the end opposite that at which the mentioned member is disposed.

9. In an air cleaner and silencer assembly, a member of bowl-like form, a filter member with air inlet and outlet orifices in it disposed within the member of bowl-like form with its side and lower walls spaced from the side wall and bottom of the bowl-like member to define a passage through which air may travel into the air inlet orifice in the filter member, a sound wave attenuating compartment which encircles the bowl-like member, a tubular member through which air may be withdrawn from the assembly, a cover which is seated on the outer edge of the filter member and constitutes a wall of a passage through which air may travel from the air outlet orifice in the filter member into the inner end of the tubular member and extends outwardly beyond the passage between the side wall of the filter member and the side wall of the member of bowl-like form and is spaced from the upper wall of the sound wave attenuating compartment to define with it a passage through which air may travel from the atmosphere into the upper end of the passage between the side wall of the filter member and the side wall of the member of bowl-like form, and an orifice through which the passage through which air travels from the atmosphere into the air inlet orifice in the filter member communicates with the sound wave attenuating compartment.

BENJAMIN GRATZ BROWN.

CERTIFICATE OF CORRECTION.

Patent No. 2,290,092.　　　　　　　　　　　　　　　　July 14, 1942.

BENJAMIN GRATZ BROWN.

It is hereby certified that error appears in the printed specification of the above numbered patent requiring correction as follows: Page 2, second column, line 12, claim 3, after the word "member" insert --and the mentioned passage--; and that the said Letters Patent should be read with this correction therein that the same may conform to the record of the case in the Patent Office.

Signed and sealed this 25th day of August, A. D. 1942.

(Seal)

Henry Van Arsdale,
Acting Commissioner of Patents.